United States Patent
Rollet (10) Patent No.: US 9,647,760 B2
(45) Date of Patent: May 9, 2017

(54) OPTIMIZED DYNAMIC BANDWIDTH SCHEDULER

(75) Inventor: Romain Rollet, L'Hermitage (FR)

(73) Assignees: MITSUBISHI ELECTRIC R&D CENTRE EUROPE BV, Schiphol Rijk Amsterdam (NL); MITSUBISHI ELECTRIC CORPORATION, Tokyo (JP)

( * ) Notice: Subject to any disclaimer, the term of this patent is extended or adjusted under 35 U.S.C. 154(b) by 399 days.

(21) Appl. No.: 13/984,160

(22) PCT Filed: Feb. 1, 2012

(86) PCT No.: PCT/EP2012/051716
§ 371 (c)(1),
(2), (4) Date: Aug. 7, 2013

(87) PCT Pub. No.: WO2012/107340
PCT Pub. Date: Aug. 16, 2012

(65) Prior Publication Data
US 2013/0315596 A1    Nov. 28, 2013

(30) Foreign Application Priority Data
Feb. 9, 2011    (EP) ..................... 11305131

(51) Int. Cl.
*H04Q 11/00*    (2006.01)
*H04B 10/27*    (2013.01)
*H04L 12/24*    (2006.01)

(52) U.S. Cl.
CPC ......... *H04B 10/27* (2013.01); *H04L 12/2424* (2013.01); *H04Q 11/0001* (2013.01)

(58) Field of Classification Search
None
See application file for complete search history.

(56) References Cited

U.S. PATENT DOCUMENTS

| 6,424,656 B1* | 7/2002 | Hoebeke | H04L 12/40006 370/412 |
| 7,593,418 B1* | 9/2009 | Benhaim | H04Q 11/0067 370/432 |

(Continued)

FOREIGN PATENT DOCUMENTS

| EP | 1311137 B | * | 5/2003 |
| EP | 1 796 313 | | 6/2007 |
| JP | 2010011509 | * | 1/2010 |

OTHER PUBLICATIONS

M Hajduczenia, Henrique da Silva, and P. Monteiro. Overflow control mechanism (OCM) for Ethernet passive optical networks (EPONs). vol. 6, No. 5 / May 2007 / Journal of Optical Networking. p. 490-513.*

(Continued)

*Primary Examiner* — Jeffrey M Rutkowski
*Assistant Examiner* — Andre Tacdiran
(74) *Attorney, Agent, or Firm* — Oblon, McClelland, Maier & Neustadt, L.L.P.

(57) ABSTRACT

A method allocating timeslots for transmission of data packets and REPORT messages in a communication network including plural logical links managed by a terminal, including: implemented at each cycle by the terminal receiving at least one REPORT message from at least one logical link, the REPORT message including an updated queue length expressed in timeslots of the logical link and, upon receiving the REPORT message, updating the image queue length, based on the updated queue length; allocating to logical links having non-zero image queue length at least one timeslot in a next cycle based on a theoretical transmission time for transmitting data packets or REPORT messages and based on a fraction of overhead associated with the transmission, until all timeslots of the next cycle are allocated or all image queue lengths are zero, and incre- (Continued)

menting the theoretical transmission time of each logical link based on its required minimum bit rate.

14 Claims, 2 Drawing Sheets

(56) References Cited

U.S. PATENT DOCUMENTS

| | | | |
|---|---|---|---|
| 2003/0016692 A1* | 1/2003 | Thomas | H04J 14/0282 370/442 |
| 2003/0095562 A1* | 5/2003 | Liu | H04L 47/10 370/442 |
| 2004/0198406 A1* | 10/2004 | Gholmieh | H04L 1/22 455/522 |
| 2006/0067269 A1* | 3/2006 | Jugl | H04W 72/121 370/329 |
| 2006/0209684 A1* | 9/2006 | Bei | H04L 1/1867 370/229 |
| 2008/0089686 A1* | 4/2008 | Kazawa | H04J 3/1694 398/71 |
| 2008/0187312 A1* | 8/2008 | Kazawa | H04J 3/1694 398/63 |
| 2009/0185530 A1* | 7/2009 | Sternberg | H04L 1/20 370/329 |
| 2009/0202242 A1* | 8/2009 | Niibe | H04Q 11/0067 398/63 |
| 2009/0238120 A1* | 9/2009 | Cai | H04W 72/1284 370/329 |
| 2010/0046369 A1* | 2/2010 | Zhao | H04W 28/24 370/232 |
| 2010/0182947 A1* | 7/2010 | Jong | H04B 7/18513 370/316 |
| 2010/0239252 A1* | 9/2010 | Davis | H04L 12/2885 398/58 |
| 2010/0254321 A1* | 10/2010 | Kim | H04L 47/14 370/329 |
| 2011/0235654 A1* | 9/2011 | Jones | H04N 21/2365 370/465 |
| 2012/0120880 A1* | 5/2012 | Lee | H04W 72/02 370/329 |
| 2013/0083755 A1* | 4/2013 | Berberana Fernandez-Murias | H04W 72/085 370/329 |

OTHER PUBLICATIONS

Miyoshi, H. et al. "QoS-aware dynamic bandwidth allocation scheme in gigabit-Ethernet passive optical networks", 2004 IEEE International Conference on Communications, ICC 2004, vol. 1, pp. 90-94, XP010710351, (Jun. 20, 2004).

Bhattia, S. et al., "IPACT with Smallest Available Report First: A New DBA Algorithm for EPON", Proceedings of the 2007 IEEE International Conference on Communications (ICC 2007), pp. 2168-2173, XP031125998, (Jun. 1, 2007).

Zheng, J. et. al., "Media access control for Ethernet passive optical networks: an overview", IEEE Communications Magazine, IEEE Service Center, vol. 43, No. 2, pp. 145-150, XP011126678, (Feb. 1, 2005).

"Media Access Control Parameters, Physical Layers and Management Parameters for Subscriber Access Networks", IEEE STD 802.3ah™-2004, (Amendment to IEEE Std 802.3™2002, total pp. 638, (2004).

"Carrier Sense Multiple Access with Collision Detection (CSMA/CD0) Access Method and Physical Layer Specifications", IEEE STD 802.3av™-2009, total pp. 229.

"Media Access Control (MAC) Bridges and Virtual Bridge Local Area Networks", IEEE Std.802.1Q™-2011, Total pp. 1365.

Draft Standard for Service Interoperability in Ethernet Passive Optical Networks (SIEPON), IEEE P1904.1™/D3.0, Total pp. 761.

International Search Report Issued Mar. 28, 2012, in PCT/EP12/051716 Filed Feb. 1, 2012.

* cited by examiner

OPTIMIZED DYNAMIC BANDWIDTH SCHEDULER

BACKGROUND OF THE INVENTION

Technical Field

The present invention generally relates to access networks and more precisely to Passive Optical Networks (PON).

It finds applications, in particular, in Ethernet Passive Optical Networks (EPON) for point to multi-point communications between a terminal and a plurality of units.

Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A PON is a single, shared optical fiber that uses inexpensive optical splitters to divide the single fiber from a Central Office (CO) into separate strands feeding individual subscribers. In such networks, information is carried by laser bursts. PONs are called 'passive' because there are no active electronics within the access network, except at subscriber endpoints and at the CO. The single fiber is divided by a passive splitter.

Ethernet Passive Optical Network (EPON) is based on Ethernet standard, unlike other PON technologies, which are based on Asynchronous Transfer Mode (ATM) standard. EPON enables to utilize the economies-of-scale of Ethernet and provides simple and easy-to-manage connectivity to Ethernet-based IP (for 'Internet Protocol') equipment, both at the subscriber endpoints and at the CO.

In such networks, the information is exchanged between layers on a per packet basis. Each packet received in a given layer is encoded with a set of encoding parameters specific to this layer. These parameters should be given through network administration means. A Data Link layer is in charge of sharing the physical resource between the subscriber endpoints and the CO. The Data Link layer is composed by two sub-layers namely the Logical Link (LL) layer and the Medium Access Control (MAC) layer. A Physical layer translates logical communications requests from the Data Link layer into hardware-specific operations to affect transmission or reception of electronic signals.

The IEEE 802.3ah EPON specification, which is also called Gigabit EPON (GEPON), defines Multi-Point Control Protocol (MPCP), Point-to-Point Emulation (P2PE) and Physical layer for 1 Gigabit EPON system (meaning that 1 Gigabit of data is transmitted in the network per second). The IEEE 802.3av specification defines extensions (mainly concerning the Physical layer) for 10 Gigabit EPON. At least, the Standard for Service Interoperability in Ethernet Passive Optical Networks (SIEPON) group, also referenced P1904.1, describes system-level requirements needed to ensure service-level, multi-vendor interoperability of EPON equipment. These specifications complement the existing IEEE Standard 802.3 and IEEE Standard 802.1, which ensure the interoperability at the Physical layer and the Data Link layer.

An EPON network usually includes an Optical Line Terminal (OLT), which can be included in the CO, and one or more Optical Network Unit (ONU), which can be in charge of one or more subscribers of the EPON. The number of ONU managed by each OLT is between four and sixty-four in current deployments.

To control a Point-to-Multi-Point (P2MP) fiber network, EPON uses the MPCP. MPCP performs bandwidths assignment, bandwidth polling, auto-discovery and ranging. MPCP is implemented in the MAC layer, introducing the 64-byte Ethernet control messages:

GATE and REPORT messages are used to assign and request bandwidth;

REGISTER message is used to control auto-discovery process.

The MAC layer is in charge of transmission arbitration that is allowing a given ONU to enable transmission from its peer for a predetermined interval of time (also called transmission window or timeslot). Start and length of the transmission windows dedicated to each ONU are defined by a Dynamic Bandwidth Allocation (DBA) scheduler comprised in the OLT.

GATE message is sent from the OLT to a given ONU and is used to assign one or several transmission window to that ONU.

REPORT message is a feedback mechanism used by an ONU to indicate its buffer occupancy (meaning the length of a queue of waiting data packets to be sent by the ONU) to the OLT, so that the DBA scheduler can define transmission windows that are adapted to the buffer occupancies of the ONUs.

Start and length of transmission windows as well as queue lengths in REPORT messages are expressed in Time Quantum (TQ) defined to be a 16 ns (nanosecond) time interval for example (i.e. time to transmit 2 bytes at a 1 Gigabit per second speed).

For compliancy reason with the IEEE 802 architecture, devices attached to PON implement a Logical Topology Emulation (LTE) function that may emulate either a shared medium or a point-to-point medium. In this later, the objective is to achieve the same physical connectivity as in switched Local Area Network (LAN), where an active splitter is used between the ONUs and the OLT. The OLT (also called legacy OLT) can have a number N of MAC ports (or interfaces), one for each ONU. Each port is identified using a Logical Link Identifier (LLID) that is assigned to each ONU during a registration procedure.

In the downstream direction, meaning from the OLT to the ONUs, Ethernet packets sent by the OLT pass through a 1*N passive splitter and reach each ONU. Each Ethernet packet comprises a frame preamble that stores the LLID of the port to which the packet is intended. Such a functioning is similar to a shared medium network and as Ethernet is perfectly compatible with EPON architecture, as Ethernet is broadcasting by nature. Thus, Ethernet packets are broadcasted by the OLT and selectively extracted by the ONUs by using the LLID that is inserted in the Ethernet frame preamble. Downstream processing in the OLT is very simple since it consists mainly of tagging incoming packets with the right LLID and forwarding them to the corresponding Logical Link.

Therefore, an EPON Data Path (EDP) can be defined as a traffic bearing object within an EPON system, which represents a data or control flow connection. Each service or high level application is mapped to a dedicated EDP, for which is attached a set of Quality of Service (QoS) parameters.

An EDP can be bidirectional unicast or unidirectional (downlink) multicast. Bidirectional unicast EDP can be implemented using two methods:

Service Level Agreement (SLA) using the different queues on a single LLID. Bandwidth parameters are defined via a new configuration message and QoS is guaranteed by a scheduling mechanism implemented in each ONU.

Multiple LLID, in which one queue (i.e. service) is mapped on one LLID using a new configuration message. Consequently, one ONU may register several LLIDs, one for each dedicated service. Bandwidth parameters for each LLID are configured in the OLT only and are allocated by the DBA.

The Multiple LLID method has several advantages:

upstream resource scheduling (meaning transmission from the ONUs to the OLT) is performed only by the DBA in the OLT. Indeed, as there is only one kind of service mapped over a logical link (i.e. only one traffic queue), there is no need to schedule different queues in the ONU, which simplifies the scheduling mechanism. There is no need to define in the standard how ONU shall deal with priority, type of scheduling algorithm, etc. REPORT message contains only one valid queue with several queue sets optionally;

Virtual LAN tags (outer and inner), which are used to identify services in SLA method, are not considered and it is not required to translate them, thus rendering the method more transparent;

the LLID field is encoded on 15 bits which enables to define 128 LLIDs for each ONU, while considering an OLT managing 128 ONUs, thus rendering the method more scalable;

any legacy OLT is compatible with ONUs that support multiple LLIDs. Indeed, the DBA in the OLT does not deal with ONUs but only with LLIDs. An ONU with many opened LLIDs is considered as a set of independent virtual ONUs from the legacy OLT point of view.

However, the Multiple-LLIDs method introduces an upstream overhead because of the introduction of additional LLIDs in the EPON architecture.

Indeed, EPON upstream overhead is mainly due to control message overhead and guard band overhead. Main contribution of control message overhead is REPORT messages that are sent by the ONUs to indicate their buffer occupancy. Guard band is a time that is left blank between two upstream bursts in order to switch on/off the laser and perform required calibrations. Other factors that contribute to overhead, as discovery overhead and frame delineation for example, can be considered as negligible.

The REPORT messages can have variable composition: they can contain the buffering occupancy of each queue (or each logical link in the presented case) and different sets can be inserted. However, REPORT message length is fixed to 64 bytes and pads with dummy data. This value being given and considering that one REPORT message is sent by each ONU during one 1 ms (millisecond) cycle, the overhead due to the REPORT message for a 1 Gbit EPON is equal to $$\frac{n_{ONU} \times (64 + 8 + 12)}{125000000 \times 0.001},$$

$n_{ONU}$ being the number of ONUs managed by the OLT, 8 bytes being used for the frame preamble and 12 bytes being the inter-frame gap between two adjacent Ethernet frames. For 32 and 128 ONUs, the REPORT message overhead equals respectively 2.15% and 8.6%. For a 10 Gbit EPON, the REPORT message overhead drops under 1% and can thus be considered as negligible.

Referring now to guard band overhead, it comprises:

a laser off time partially overlap by a laser on time dedicated to the next ONU, which is fixed at 512 ns (nanoseconds);

a dead zone of 128 ns between the switching off of the laser of an ONU and the switching on of the laser of the next ONU, to which an opportunity is dedicated;

an Automatic Gain Control (AGC) time set to a discrete value comprised between 96 ns and 400 ns specified by the IEE802.3ah D1.414 specification;

a Clock and Data Recovery (CDR) time set to a discrete value comprised between 96 ns and 400 ns specified by the IEE802.3ah D1.414 specification.

Considering the worst case, with AGC time and CDR time being equal to 400 ns, guard band time is equal to 1.44 μs (microsecond). Then, considering that each ONU has an opportunity (defined in the GATE messages sent by the OLT) in each 1 ms cycle, the guard band overhead is equal to $$\frac{n_{ONU} \times 1.44}{1000}.$$

For 32 and 128 ONUs, the guard band overhead equals respectively 4.6% and 18.4%. The guard band overhead is identical for 1 Gbit and 10 Gbit EPONs.

Table 1 summarises upstream overhead for different numbers of ONUs in a 1 Gbit EPON with a 1 ms DBA cycle, each ONU having an opportunity to send data to the OLT in each cycle.

TABLE 1

| Number of ONUs | Control message overhead (%) | Guard band overhead (%) | Total overhead (%) | Remaining bytes for user data |
|---|---|---|---|---|
| 16 | 1 | 2.3 | 3.3 | 7548 |
| 32 | 2.12 | 4.6 | 6.75 | 3642 |
| 64 | 4.3 | 9.2 | 13.5 | 1689 |
| 128 | 8.6 | 18.4 | 27 | 713 |
| 256 | 17.2 | 36.8 | 54 | 224 |

Referring to the results contained in Table 1, it is not reasonable to manage more than 32 ONUs per DBA cycle. Indeed, beyond 32 ONUs per DBA cycle, the overhead exceeds 10% and the transmission window allows transmitting only one 1500-bytes frame since its length expressed in bytes is lower than 2000 bytes.

Thus, there is a need to reduce the overheads due to REPORT messages and guard band in EPON architecture without impacting on the transmission opportunities offered to the ONUs.

SUMMARY OF THE INVENTION

To address these needs, a first aspect of the present invention relates to a method for allocating upstream timeslots for transmission of data packets and REPORT messages in a communication network, the network comprising a plurality of logical links managed by a unique terminal, each logical link being associated to a queue containing waiting data packets to be sent, a minimum bit rate being required by each logical link for transmission of the data packets, time being divided in cycles, each cycle being divided in equal timeslots, a length of a queue being expressed in timeslots, a theoretical transmission time being initially defined in the terminal for each logical link, each transmission being associated with a fraction of overhead, the terminal storing an image queue length for each logical link, the method comprising the following steps implemented at each cycle by the terminal:

receiving at least one REPORT message from at least one logical link, the REPORT message comprising an updated queue length of the logical link, the length being expressed in timeslots;

upon reception of the REPORT message from the logical link, updating the image queue length based on the updated queue length;

allocating to logical links, for which image queue length is not zero, at least one timeslot in the next cycle based on the theoretical transmission time for transmitting data packets or REPORT messages and based on the fraction of overhead associated with the transmission, timeslots being allocated until all timeslots of the next cycle are allocated or until all image queue lengths are zero; and incrementing the theoretical transmission time of each logical link based on its required minimum bit rate and decrementing the image queue length of the logical link of the at least one timeslot allocated to it.

The method according to the invention enables advantageously to allocate timeslots to logical links of ONUs for transmission of data packets by taking into account a required minimum bit rate. Indeed, each logical link can be specific to a given service, which can require different bit rates to obtain a satisfying quality of service. The proposed method suggests to this end defining a state time variable defining a theoretical transmission time for a given logical link. Thus, logical links that are associated with a low required minimal bit rate are not served at each cycle, thus reducing the guard band overhead associated with their upstream transmission. Furthermore, inactive logical links do not send a REPORT message at each cycle, which enables to reduce the control message overhead. The total overhead is thus reduced without reducing the quality of service, given that a minimum bit rate is respected for each logical link.

In another embodiment of the invention, a multiple of n consecutive timeslots are allocated to each logical link for which image queue is not zero, n being a predefined integer greater than one defined for each logical link.

This embodiment enables to reduce the number of allocations per cycle, thus rendering the implementation of the method faster. A granularity of n can be prefixed in order to facilitate the transmission of entire Ethernet data packets, which cannot be fragmented.

In still another embodiment, M being a prefixed maximum number of logical links to be served during one cycle, only the M logical links having the lowest theoretical transmission times are allocated with at least one timeslot of the next cycle for transmission of data packets.

Thus, the number of logical links that are served during one cycle is limited to a prefixed number, thus ensuring a limitation of the total overhead. Furthermore, the M selected logical links during one cycle are logical links which have not be served during the previous cycle (except for logical link having very high minimum bit rate), which enables to implement a fair queuing scheme.

In complement, if the M image queue lengths of the M logical links are zero after allocating at least one timeslot of the next cycle for transmission of data packets, timeslots of the next cycle that have not been allocated are allocated to the next logical links with the lowest theoretical transmission times until all the timeslots of the next cycle are allocated or until all image queue lengths are zero.

This embodiment enables advantageously to utilize all the resources (the timeslots) offered during one cycle. To this end, more than M logical links can be selected during one cycle without reducing the fairness of the method.

In still another embodiment of the invention, a polling period being prefixed as an integer number of cycles for each logical link, timeslots are allocated to a logical link for transmission of a REPORT message at the next cycle if the image queue length of the logical link remains zero during the polling period.

Thus, inactive logical links have a regular opportunity to require timeslots for transmission if they have been inactive during a prefixed polling period. The method enables advantageously to facilitate the allocation of timeslots for logical link that have been inactive during a long period.

According to still another embodiment of the invention, a maximum bit rate being prefixed for each logical link, a peak bit rate period being prefixed, the number of timeslots that are allocated to a given logical link over the peak bit rate period is limited by the maximum bit rate of the logical link multiplied by the peak bit rate period.

This embodiment enables advantageously to not systematically favour the same logical links, for example in the case where there are only few logical links to be served and where one logical link has a high required minimum bit rate. This embodiment enables to limit the allocation to a given logical link.

In still another embodiment, the REPORT message further comprises multiple queue sets reporting different cumulative lengths of data frames contained in the queue of the logical link sending the REPORT message and the number of consecutive timeslots allocated to the logical link by the terminal equals one of the cumulative lengths.

This embodiment enables to avoid obtaining a high unused resource ratio as it will be explained in the specifications.

According to another embodiment of the invention, a threshold being defined for each queue set and being preset as a multiple of the ratio of the number of timeslots comprised in a cycle on the prefixed maximum number of logical links to be served during one cycle, the reported cumulative length is equal to the cumulative length of data frames of a queue set not exceeding the threshold of the queue set.

This embodiment enables to efficiently preset thresholds defined for each queue set.

In still another embodiment of the invention, the plurality of logical links being divided in subsets having a number of logical links, the number of logical links being greater than or equal to one, each subset being associated to a priority, each priority being associated to a given minimum bit rate, the minimum bit rate associated with a logical link belonging to a subset is defined by the ratio of the given minimum bit rate on the number of logical links of the subset.

This embodiment enables to simplify the configuration of the method according to the invention.

In complement, the method further comprises the updating of the minimum bit rate associated with a logical link belonging to a subset, each time a new logical link enters or quits the subset.

This embodiment enables to have dynamic parameters that can adapt the method to variations of transmission parameters during different cycles.

In still another embodiment, the logical links of a same subset have different minimum bit rates, the sum of the minimum bit rates of the logical links of the subset being lower than the given minimum bit rate associated with the priority of the subset.

This embodiment enables to define different weights for logical links of the same subset, thus improving the flexibility of the method according to the invention.

Another object of the invention concern a program product recorded on a storage medium and executable by a computer in the form of a software agent, the program product including at least one software module set up to perform the method according one of the previously described embodiment.

Another object of the invention relates to a terminal for allocating timeslots for transmission of data packets and REPORT messages in a communication network, the network comprising a plurality of logical links managed by a terminal, each logical link being associated to a queue containing waiting data packets to be sent, a minimum bit rate being required by each logical link for transmission of the data packets, time being divided in cycles, each cycle being divided in equal timeslots, a length of a queue being expressed in timeslots, a theoretical transmission time being initially defined in the terminal for each logical link, each transmission being associated with a fraction of overhead, the terminal storing an image queue length for each logical link, the terminal comprising means for:

receiving at least one REPORT message from at least one logical link, the REPORT message comprising an updated queue length of the logical link, the length being expressed in timeslots;

updating, upon reception of the REPORT message from the logical link, the image queue length based on the updated queue length;

allocating to logical links, for which image queue length is not zero, at least one timeslot in the next cycle based on the theoretical transmission time for transmitting data packets or REPORT messages and based on the fraction of overhead associated with the transmission, timeslots being allocated until all timeslots of the next cycle are allocated or until all image queue lengths are zero; and incrementing the theoretical transmission time of each logical link based on its required minimum bit rate and decrementing the image queue length of the logical link of the at least one timeslot allocated to it.

Another object of the invention concerns a system comprising a plurality of network units, each unit comprising at least one logical link, and a terminal for managing the logical links, each logical link being associated to a queue containing waiting data packets to be sent, a minimum bit rate being required by each logical link for transmission of the data packets, time being divided in cycles, each cycle being divided in equal timeslots, a length of a queue being expressed in timeslots, a theoretical transmission time being initially defined in the terminal for each logical link, each transmission being associated with a fraction of overhead, the terminal storing an image of queue length for each logical link, the terminal comprising means for:

receiving at least one REPORT message from at least one logical link, the REPORT message comprising an updated queue length of the logical link, the length being expressed in timeslots;

updating, upon reception of the REPORT message from the logical link, the image queue length based on the updated queue length;

allocating to logical links, for which image queue length is not zero, at least one timeslot in the next cycle based on the theoretical transmission time for transmitting data packets or REPORT messages and based on the fraction of overhead associated with the transmission, timeslots being allocated until all timeslots of the next cycle are allocated or until all image queue lengths are zero; and incrementing the theoretical transmission time of each logical link based on its required minimum bit rate and decrementing the image queue length of the logical link of the at least one timeslot allocated to it.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

A solution to reduce the overhead due to REPORT messages and guard band is to reduce the number of logical links $LL_i$ scheduled or served in each DBA cycle. Without limiting the total number of logical links $LL_i$ supported in the EPON, the method consists in a dynamic assignment of logical link transmission opportunity (or allocation of timeslots in a given DBA cycle) instead of the legacy assignment presented in the part relating to the state of the art.

Such a solution leads to reduce the overhead. To avoid obtaining an unfair queuing scheme, because this solution increases the upstream transmission time, given that ONUs shall wait several cycles before having timeslots allocated to them, the invention introduces for each logical link $LL_i$ a next time emission value $TTT_i$ that guarantees fairness among the different logical links $LL_i$.

Thus at each cycle k, a trace of how were served the logical links $LL_i$ in the past is maintained so that the same logical links $LL_i$ are not always favoured. Thus, at cycle k+1, the invention proposes to serve logical links $LL_i$ that have not been served at cycle k.

For the sake of better understanding, some implementations of the method are described hereafter.

Figure 1:
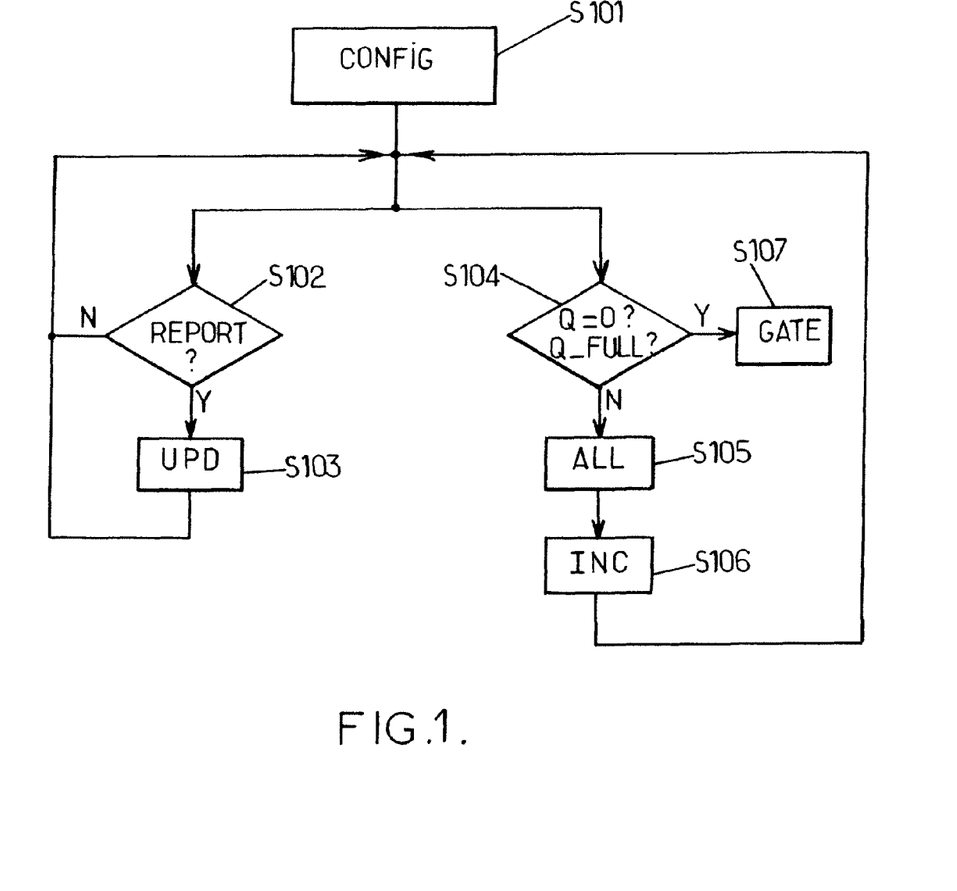
FIG. 1 represents a flowchart of the steps of a method according to one embodiment of the invention.

Referring to FIG. 1, there is shown therein a flowchart of the steps of a method according to one embodiment of the invention.

Figure 2:
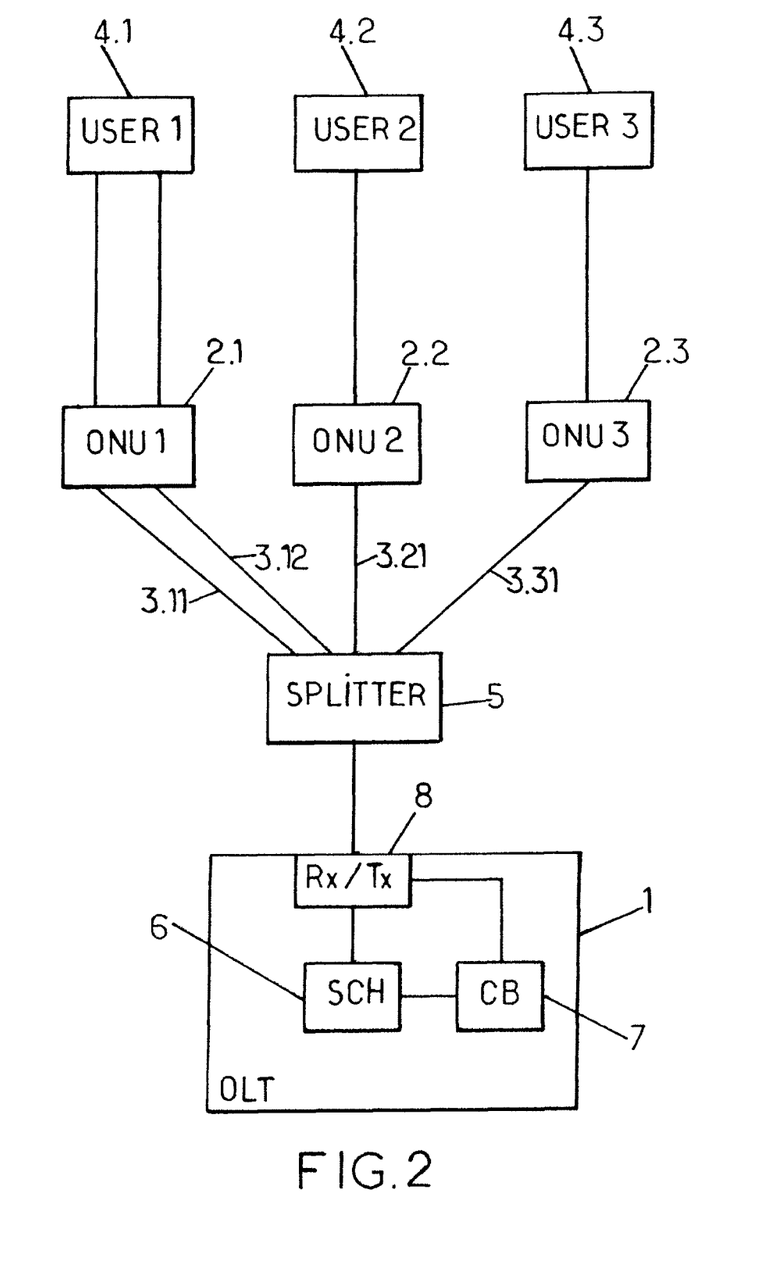
FIG. 2 represents a system according to one embodiment of the invention.

These steps can be implemented by a scheduler of the OLT, which will be presented in reference to FIG. 2.

At step S101, a weight $W_i$ is assigned to each of the logical links $LL_i$, where $W_i$ reflects a minimum bit rate $b_i$ granted to logical link $LL_i$. A granularity is also defined, corresponding to the lowest number of timeslots that can be allocated by the scheduler. We consider as an example a granularity of one Time Quantum (TQ), which is initially normalized so that a TQ equals one unit of time. It is thus possible to translate the minimum bit rate $b_i$ into a fixer inter-TQ time interval $T_i$ with $$T_i = \frac{1}{W_i}.$$

At step S102, if a REPORT message is received by the OLT from one of the ONUs managed by the OLT, the REPORT message being relative to a logical link $LL_i$, then the following algorithm is performed by the scheduler at step S103. The REPORT message can include an updated queue length, that can correspond to a number of TQs equal to $M_i$ that are required for a transmission of data packets on the logical link $LL_i$. The OLT stores an image of each queue corresponding to data packets to be sent in a given logical link $LL_i$. The image queue length is noted $Q_i$ and is expressed in TQs. The scheduler then performs the following operations at step S103:

```
If Q_i=0
    If{TTT_j, Q_j ≠ 0}≠ Ø
        /there is at least one backlogged connection/
        TTT_i=max(TTT_i,min_j(TTT_j))
    Else
        TTT_i=max(TTT_i, TTT^-1)
    Endif
Endif
Q_i=M_i-G_i
with TTT^-1 being the Theoretical Transmission Time of the last sent
TQ of data packets.
```

Such an algorithm enables to favour the allocation of TQs for a logical link $LL_i$ that was inactive before the reception of the REPORT message and that requires a number $M_i$ of TQs for transmission of data packets. Indeed, if at least one logical link $LL_j$ of the EPON is active, then the $TTT_i$ allocated to the logical link $LL_i$ is equal to the maximum among the last $TTT_i$ allocated to it and the minimum of the $TTT_j$ of the active logical links $LL_j$. Indeed, it is possible that inactive logical links have not transmitted data for a long time and TQs can be allocated to them quite fast to respect the fairness of the queuing scheme. Otherwise, the $TTT_i$ allocated to the logical link $LL_i$ is equal to the maximum among the last $TTT_i$ allocated to it and the Theoretical Transmission Time of the last sent TQ of data packets $TTT^{-1}$.

If the logical link sending the REPORT message was already active, then the image queue length $Q_i$ is simply equal to the number of TQs $M_i$ that are required by the logical link $LL_i$ minus the number of granted resource $G_i$ for the currently scheduled cycle After the scheduler has updated the image queue length $Q_i$, it waits for a new REPORT message to be received during the cycle k, as scheduled during cycle k−1.

In parallel to steps 102, step S104 is performed, during which the cycle k+1 is build by the scheduler or a cycle builder associated to the scheduler.

Contents and structure of the EPON cycle is defined dynamically and depend on the number of logical links scheduled, on the amount of TQs allocated to them and the number of ONUs involved.

In addition, the application of frame building rules to allocate timeslots (TQs) to logical links $LL_i$ as well as the allocation of timeslots for the signalling messages (REPORT messages) introduce various overheads. As a result, physical layer overhead (guard band interval, preambles) and signalling overhead (REPORT message overhead) may change from one cycle k to the next k+1 causing the capacity actually offered by the physical layer to appear a variable resource to the MPCP layer. However, the scheduler aims at sharing a non variable resource that can be expressed in terms of TQs offered by the MPCP layer.

Consequently, the cycle builder checks whether the resource allocated in the MPCP layer matches the actual available physical resource at step S104.

Operation of the frame builder is based on a progressive construction of the cycle k+1 during cycle k paced by time elapsing during cycle k. Time is materialized by a state variable CurrTime that is incremented upon every tick produced by a reference time base with a period equal to one TQ. Other inputs of the cycle builder are a list of cycle building rules and the scheduler output. Based on the latter, the cycle builder maintains a second time variable NextFreeSlot, that points at the next free location in the cycle k+1, or timeslot, each time a new TQ is allocated in the cycle k+1. CurrTime and NextFreeSlot variables are reset at the beginning of each cycle.

In the following, a granularity of n is considered, n being an integer greater or equal to 1. An actual physical length of n TQs, including the fraction of overhead required for its insertion in the frame, is noted $T_{TQs}$ and the duration of a cycle is noted $T_{cycle}$.

$T_{TQs}$ takes into account Guard Band Interval and presence of REPORT message. For instance, when n TQs are allocated to a logical link $LL_i$ that was not served previously in the cycle k+1, then $T_{TQs}=n+T_{GBI}+T_{REPORT}$, where $T_{GBI}$ is the length of the Guard Band Interval (expressed in TQs) and $T_{REPORT}$ is the length of a REPORT message ($T_{REPORT}=32TQs$).

Cycle construction can then be described by the following algorithm:

```
If CurrTime≥NextFreeSlot
    If elastic scheduler is ready to serve a logical link LL_i
        Cycle builder computes T_TQs
        If (NextFreeSlot + T_TQs) ≤ T_cycle
            Insert candidate TQs for logical link LL_i
            Update elastic scheduler variables
            NextFreeSlot = NextFreeSlot + T_TQs
        Endif
    Endif
Endif
```

For the sake of better understanding, in particular for the understanding of the reference to the scheduler variables, an algorithm is performed by the scheduler with a maximum granularity for each logical link $LL_i$, that equal $N_i$ TQs, upon logical link service. In the following, $G_i$ refers to the number of TQs granted to a logical link $LL_i$ in cycle k+1. Note that $G_i$ is reset before beginning the cycle construction.

```
If{TTT_j, Q_j ≠ 0}≠ Ø
    TTT_i = min_j(TTT_j), with j such as Q_j ≠ 0
    / meaning that TTT_i is the minimum Theoretical Time along all
    backlogged connections/
    G_i = G_i + min(N_i,Q_i) /allocate some TQs to logical link LL_i/
    TTT_i = TTT_i + T_i
    Q_i = Q_i - min (N_i,Q_i)
Endif
```

Thus, min $(N_i,Q_i)$ TQs are allocated to logical link $LL_i$, if this logical link has the lowest $TTT_i$. Thus, only TQs that are required by a logical link $LL_i$ can be allocated to it.

To perform a more precise algorithm, $N_i$ can be replaced by a granularity equal to one TQ. However granularity $N_i$ enables to provide a faster implementation of this algorithm, without impacting too much the fairness of the algorithm.

Referring to the cycle builder algorithm previously described, at step S104, cycle builder checks whether there are logical links that require timeslots (or TQs) for a transmission of data packets (If elastic scheduler is ready to serve a logical link $LL_i$ corresponds to If$\{TTT_j, Q_j \neq 0\} \neq \phi$ in the scheduler algorithm upon logical link service). If at least one image queue length does not equal zero, then cycle builder checks if some timeslots are still available in the next cycle k+1 for allocation of timeslots to the logical link $LL_i$ selected by the scheduler (If (NextFreeSlot+$T_{TQs}$)≤$T_{cycle}$) after having computed $T_{TQs}$ on the basis of the various overheads.

If both conditions are respected, cycle builder allocates, at step S105, timeslots to the selected logical link $LL_i$, based on the granularity associated with logical link $LL_i$, in the next cycle k+1.

The variables $G_i$, $TTT_i$ and $Q_i$ are incremented at step S106 ($G_i=G_i+\min(N_i,Q_i)$; $TTT_i=TTT_i+T_i$; $Q_i=Q_i-\min(N_i,Q_i)$), as explained in the cycle construction algorithm (Update elastic scheduler variables). The variable NextFreeSlot is also incremented (NextFreeSlot=NextFreeSlot+$T_{TQs}$) in order to further allocate timeslots to logical links, if timeslots are still available.

At step S104, if one of the two conditions is not respected, then the cycle builder has ended the construction of the cycle k+1. The OLT waits for the end of cycle k before transmitting GATE messages at a step S107 to the selected ONUs so that they can transmit data packets in the selected logical links $LL_i$ during the timeslots of the cycle k+1 that have been allocated to them. After GATE transmission for logical link $LL_i$, the variable $G_i$ is reset. At cycle k+1, the previously described steps S102-S107 are iterated in order to build cycle k+2. In some embodiments, the configuration step S101 can also be iterated.

In another embodiment, the cycle construction algorithm may be extended to support several types of scheduler and to ensure priority between them. For instance, a rigid scheduler based on an Earliest Due Date (EDD) service discipline with packet spacing derived from a Virtual Scheduling Algorithm can be implemented to provide delay and bandwidth guarantees. In this case, when a slot becomes available, priority is actually given to provide the next TQs allocated to a logical link $LL_i$ to be inserted in the cycle k+1. Resource is then allocated to data of an elastic connection in the second place. By this mean, rigid logical links are always guaranteed to receive service according to their delay constraints.

In another embodiment of the invention, at step 101, a maximum number M of logical links to be served during one cycle is prefixed. The total number of resources available in one cycle is noted R (corresponding to the number of TQs in one cycle). For example, for a cycle which duration is 1 ms in a 1G EPON, R=62500 TQs. For each cycle, a set S of logical links $LL_i$ with $G_i \neq 0$ is defined.

In this embodiment, logical link service algorithm performed at steps S104, S105 and S106 by the scheduler is:

```
m=M
If{TTT_j, Q_j ≠ 0} ≠ Ø
  If Size(S)<m
    TTT_i=min_j(TTT_j), with j such as Q_j ≠ 0
  Else
    TTT_i=min_j(TTT_j), with j such as Q_j ≠ 0 and G_j ≠ 0
  Endif
  /TTTi is the minimum Theoretical Transmission Time among
  all backlogged connections/
  G_i = G_i + min(N_i,Q_i) /allocate some TQs to logical link LL_i/
```

-continued

```
  TTT_i = TTT_i + T_i
  Q_i = Q_i - min (N_i,Q_i)
Endif
```

To detail the previous algorithm, the logical links with the lowest $TTT_i$ are previously selected until M logical links are selected and served in priority. Indeed, when Size(S)<m (Size(S) relates to number of logical links in the set S), only the logical links for which at least one timeslot has already been allocated during the cycle (for which $G_j \neq 0$) can be selected for further allocation until all image queue length $Q_j$ are equal to zero or until there is no more timeslot to be allocated in the cycle. Note that $TTT_i$ is incremented each time logical link $LL_i$ is selected ensuring that logical link $LL_i$ will not be selected during the next cycle (if there are enough active logical link compared to the number M) and thus ensuring a fair queuing scheme.

Such a modification leads to limit the number of logical links $LL_i$ scheduled in one cycle. However, some resources (timeslots or TQs) may still be available because the M image queue lengths $Q_i$ of the M selected logical links $LL_i$ are at least equal to zero. In this case, remaining timeslots noted in the following r are shared among logical links that have not been served during the cycle.

The maximum number m of new additional logical links is incremented in the previous algorithm (service algorithm) using the following formula:

$$m = m + \frac{r}{R} \times M$$

Then, the same service algorithm is run using the new value of m. The iterative process is repeated until there is no more timeslots that are available or all image queue lengths $Q_i$ are equal to zero.

In another embodiment of the invention, a maximum polling period $PP_i$ can be defined at step S101 for each logical link $LL_i$. Maximum polling period $PP_i$ is expressed as a number of cycles.

Indeed, inactive (or idle) logical links are logical links with empty image queues for which no resource is currently allocated by the scheduling process. However, it can be useful to poll them periodically (i.e. grant some sufficient upstream resource or timeslots in order to enable them to transmit at least one REPORT message during one of the next cycles) in order to maintain an image of their queues in the OLT and allocate resource when some incoming packets enter the queues of these logical links. Some resource request can be done internally to the OLT in order to request some resource to the scheduler for inactive logical links.

A variable noted $NextPollCycle_i$ can be defined a step S101, which contains the next time (expressed as a cycle number) some resource shall be allocated for polling the inactive logical link $LL_i$. $NextPollCycle_i$ is reset to the value CurrentCycle+$PP_i$ at step S106 each time some resource is allocated to logical link $LL_i$ at step S105. When CurrentCycle≤$NextPollCycle_i$, then some resource is requested to the scheduler internally, and the operations executed upon a REPORT message arrival in the OLT are executed by the scheduler. It shall be noted that inactive logical links (i.e. not backlogged logical links) are normally served with priority because their $TTT_i$ are normally aligned to lowest $TTT_i$ of backlogged logical links or to the last served logical link (see the scheduler algorithm upon reception of a REPORT message).

Different polling algorithms can be implemented, the simplest one being a polling process with a fix polling period $PP_i$. Note that the polling period PPi adds an extra delay when a logical link $LL_i$ becomes active. While the logical link $LL_i$ stays active, data frames do not experience this extra delay because the REPORT message is systematically transmitted in each upstream transmission window.

In still another embodiment of the invention, a maximum allowed bit rate $L_{max,i}$ can be defined at step S101 for each logical link $LL_i$. Indeed, some network operators may want to limit the bandwidth allocated to each logical link LLi. For instance, a customer upstream maximum bit rate may be limited to 100 Mbit/s (megabits per second). The proposed elastic scheduler is able to deal with minimum bit rate $b_i$ by means of the weight parameter $W_i$ but not with a maximum allowed bit rate.

To achieve that, a leaky bucket algorithm can be added prior to the scheduling algorithm at step S105. We assume in the following that the maximum allowed bit rate $L_{max,i}$ is evaluated over a peak bit rate period $T_{PBR}$ that can be greater than one cycle. For instance, we may fix $T_{PBR}$=10 ms. The maximum number of TQs that can be allocated during the peak bit rate period $T_{PBR}$ is equal to:

$$R_{PBR,i} = L_{max,i} \times \frac{T_{PBR}}{8 \times 2}$$

Consequently, every peak bit rate period $T_{PBR}$, a leaky bucket $B_i$ (the number of TQs that still can be allocated to a given logical link $LL_i$ during the peak bit rate period $T_{PBR}$) is reset to $R_{PBR,i}$. Each time some TQs are allocated to logical link $LL_i$, the leaky bucket $B_i$ is decreased at step S106 from the allocated resource until it reaches 0. Then, no more TQ can be allocated to that logical link $LL_i$ (meaning that logical link $LL_i$ is banned from the list of schedulable logical links) until the leaky bucket $B_i$ is reset to $R_{PBR,i}$.

The resources reported by ONUs are expressed in TQ units depending on the chosen granularity and Ethernet data packets may have variable length. Furthermore, Ethernet data packets can not be fragmented by the ONUs so the timeslots allocated by the OLT may not be entirely used by ONUs. For instance, by supposing an ONU reports a queue with four data frames of 1514 bytes (=707 TQs) and the OLT only allocates an upstream transmission window of 2000TQs to that ONU, then only two data frames can be sent during this window and 486 TQs will be lost. Such a situation occurs when the scheduling process can not allocate the whole requested resource in a single grant structure.

The unused ratio is defined as the ratio between unused resource and total available resource during one cycle. This ratio increases when the number of ONUs scheduled in one cycle grows and when large packets are used. Consequently, considering that the number of TQs allocated to a logical link LLi is independent from the data frame size waiting in the queue of the logical link LLi and randomly distributed, we note the unused resource ratio is proportional to the number of logical links scheduled per cycle and to the data frame size.

According to a study based on some data sets captured in 1998 and 2008, Internet traffic is almost composed of small (<100 bytes) and large packets (>1400 bytes) with an equal repartition. Being given that large packets induce an important unused resource ratio (which may reach 20% for 32 ONUs), unused resource because of inadequate transmission window is a real issue.

Another embodiment enables to overcome this situation. Indeed, REPORT messages may contain for each queue length multiple queue set lengths, at step S102. Each queue set length reports a cumulative length of data frames starting from the head queue. Because the EPON standard is quite vague about the usage of queue sets, the SIEPON standard should define how the queue sets shall be implemented. Several thresholds are defined for each queue of each logical link $LL_i$ (one for each queue set), and the reported queue set length would be equal to the cumulative length of packets not exceeding the threshold.

Multiple queue sets refine the image of the queue maintained by the OLT and give more information to the scheduling process. To be profitable, timeslots allocation at step S105 can be performed with a granularity equal to the thresholds. In complement, the scheduler can have access to a list of waiting data packet lengths, but this information is too heavy to be signalled from ONUs to the OLT. According to the SIEPON contributions, a maximum of 4 queue sets can be used for a single queue. One can be reserved for the whole queue (no threshold), so three queue sets are available for intermediate thresholds.

According to the SIEPON contributions, the thresholds defined for each queue set may be configured by the OLT using configuration messages. It can be supposed that thresholds can be updated but not on a fast period basis. So, thresholds can be set on a semi-static way. Defining the thresholds in this situation can be quite difficult, since it is difficult to forecast how a queue of a logical link will be served by the OLT in the next cycles because of traffic variation during time. However, as the invention proposes in one embodiment to limit the number of logical links to be served during one cycle to the number M, the ratio R/M can be used as a basis to fix the value of the smallest threshold, R being the total number of TQs to be allocated during one cycle. Other thresholds may be defined as a multiple of this value to deal with cases where many more TQs are available for a single logical link. However, as the mean unused resource ratio decreases with the transmission window size (number of timeslots or TQs allocated), it is less interesting to set large thresholds.

For instance, with M=16 and in a 1G EPON (meaning with R=125000 bytes), thresholds may be set to 7812, 12624 and 23436 bytes. Beyond that threshold, the maximum unused resource ratio is less than 6%.

As previously stated, a weight $W_i$ is attached to each logical link $LL_i$, where $W_i$ reflects the minimum bit rate $b_i$ granted to logical link $LL_i$. More precisely, this minimum bit rate $b_i$ can be given by the following formula:

$$b_i = \frac{W_i}{\sum_k W_k} \cdot B$$

where B is the total amount of available bandwidth (1 Gbps or 10 Gbps for example)

If all logical links have the same weight, then they will experience the same minimum bandwidth equal to B/N, where N is the number of logical links $LL_i$. It can be noticed that upstream resource is allocated and granted to a logical link $LL_i$ only if its associated queue in the ONU is not empty. Unused resource is then shared between active logical links.

In EPON system, the different data flows are often ordered by priority, so a conversion (or mapping) from priority to weight can be done to correctly setting the scheduling parameters at step S101.

To this end, different levels of priority $p_j$ associated with one or several logical links $LL_i$ can be defined at step S101. For each level of priority $p_j$, the maximum ratio of bandwidth $R_j$ can be used for all data packets transmission in logical links $LL_i$ with priority $p_j$. Let be $S_e$ the set of logical links $LL_i$ and $S_j$ the set of logical links $LL_i$ associated with priority $p_j$. Weight can be normalized so that $$\sum_{k \in S_e} W_k = 1.$$

So the following relations are obtained:

$$R_j = \sum_{k \in S_j} W_k \text{ and } \sum_j R_j = 1$$

It can be considered that all data packets transmissions with a single priority $p_j$ may require the same service level (same bandwidth requirement). Thus, all logical links $LL_i$ with priority $p_j$ have the weight $W_j = R_j/N_j$ with $N_j$ being the number of logical links $LL_i$ belonging to the set $S_j$. In one embodiment, each time a new logical link $LL_i$ is opened or closed, meaning each time a logical link $LL_i$ enters or quits a set $S_j$, weight $W_j$ is updated at step S101, using the formula $W_j = R_j/N_j$.

In the following example, we suppose 5% of bandwidth is reserved for Voice over IP (VoIP) service, 20% for video service, 25% for Virtual Private Network (VPN) service and 50% for other services (best effort). So, the given percentages suppose that less than 50 Mbps is reserved for VoIP traffic. We also suppose the maximum number of ONUs is 128, each ONU having dedicated logical links for VoIP and best effort. However, only half the ONUs has VPN and video services.

The following results are obtained:

$W_0 = R_0/N_0 = 0.05/128 = 3.9 \cdot 10^{-4}$ $W_1 = R_1/N_1 = 0.20/64 = 3.1 \cdot 10^{-3}$ $W_2 = R_2/N_2 = 0.25/64 = 3.9 \cdot 10^{-3}$ $W_3 = R_3/N_3 = 0.50/128 = 3.9 \cdot 10^{-3}$ For some services, some operators may want to guaranty a minimum bit rate $b_i$ in addition to traffic priority. For instance, it can be useful to provide the VPN customers with different minimum bit rates $b_i$ (multiple of 64 kbps for example). So, for a same set $S_j$ of priority $p_j$, logical links $LL_i$ will have different weight values. In that case, if a minimum bit rate $b_k$ is provisioned for logical link $LL_k$ belonging to the set $S_j$ (with priority $p_j$), then weight $W_k$ becomes:

$$W_k = \frac{b_k}{\sum_{i \in S_j} b_i} \cdot R_j$$

Bandwidth reserved for the set Sj is noted Bj ($B_j = B \cdot R_j$) and the following condition must be respected:

$$\sum_{i \in S_j} b_i \le B_j$$

In the previous example, the following subscriptions are taken into account for the VPN customers:
  32 customers with 1 Mbps and weight $W_{2,1 \ Mbps}$
  24 customers with 2 Mbps and weight $W_{2,2 \ Mbps}$
  8 customers with 10 Mbps and weight $W_{2,10 \ Mbps}$ A total bandwidth of 160 Mbps is thus obtained for VPN service (<250 Mbps). The following weights are then calculated for the logical links belonging to $S_2$ (the set associated with VPN services):

$W_{2,1 \ Mbps} = 1.56 \cdot 10\text{-}3;$ $W_{2,2 \ Mbps} = 3.1 \cdot 10\text{-}3;$ $W_{2,10 \ Mbps} = 1.56 \cdot 10\text{-}2.$ Those simple conversion rules show that the proposed scheduling algorithm is quite simple to configure and can support:
  bandwidth sharing among classes of services with different priorities;
  bandwidth provisioning within a particular class of service.

Referring now to FIG. 2, there is shown therein a system according to one embodiment of the invention. The system comprises an OLT 1 adapted to implement the method according to the invention, the OLT 1 being connected to a plurality of ONUs 2.1, 2.2 and 2.3, each ONU being associated to a respective user 4.1, 4.2 and 4.3. Of course, an ONU can be in charge of the service of a plurality of users.

The OLT 1 is connected to the ONUs 2.1, 2.2 and 2.3 via an EPON comprising a passive splitter 5 to divide the optical fiber from the OLT 1 in a plurality of optical fibers, each optical fiber from the plurality being associated to a logical link 3.11, 3.12, 3.21 and 3.31. For example, each logical link can be associated to a given service (see the previous examples). In this embodiment, ONU 2.1 manages both logical links 3.11 and 3.12, ONU 2.2 manages logical link 3.21 and ONU 2.3 manages logical link 3.31. ONUs are adapted to transmit data packets via the logical links, in timeslots that are defined by the OLT 1 via GATE messages according to the method of the invention and can send REPORT messages to the OLT 1 during their transmission timeslots.

To this end, the OLT 1 comprises a scheduler 6, a cycle builder 7 and a network interface 8. While receiving REPORT messages from OLT, the scheduler 6 and the cycle builder 7 are adapted to perform the previously described algorithms in order to build cycles in which timeslots are allocated in a fair way to the ONUs 2.1, 2.2 and 2.3 for transmission of data packets in the different logical links 3.11, 3.12, 3.21 and 3.31. The interface 8 is adapted to build GATE messages, to include an identifier of a logical link in the head of the GATE message, and to receive REPORT messages from the ONUs.

The present invention can also be embedded in a computer program product, which comprises all the features enabling the implementation of the methods described herein, and which, when loaded in an information processing system, causes the information processing system. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method of transmitting data packets and REPORT messages according to a timeslot allocation in a communication network, said network including a plurality of logical links $LL_i$ managed by a terminal, each logical link being associated to a queue containing waiting data packets to be sent, a minimum bit rate $b_i$ being required by each logical link for transmission of the data packets, time being divided in cycles, each cycle being divided in equal timeslots TQs, a length of a queue being expressed in timeslots TQs, a theoretical transmission time $TTT_i$ being initially defined in said terminal for each logical link $LL_i$, respectively, and the terminal storing an image queue length $Q_i$ for each logical link $LL_i$, respectively, the method, implemented at each cycle k by the terminal, comprising:

receiving at least one REPORT message corresponding to a logical link $LL_i$ in the plurality of logical links $LL_i$, said REPORT message including an updated queue length of said corresponding logical link $LL_i$, said length being expressed in timeslots;

upon reception of said REPORT message from said logical link $LL_i$, updating said image queue length $Q_i$ for said corresponding logical link $LL_i$ based on the updated queue length;

allocating, to each of the logical links in the plurality of logical links $LL_i$, for which image queue length is not zero, at least one timeslot TQ in a next cycle k+1 based on the theoretical transmission time $TTT_i$ of the corresponding logical link $LL_i$ for transmitting the data packets or REPORT messages and based on a length of a Guard Band Interval and a number of timeslots required to transmit the REPORT messages, timeslots TQs being allocated until all timeslots TQs of the next cycle k+1 are allocated or until all image queue lengths $Q_i$ are zero;

incrementing the theoretical transmission time $TTT_i$ of each logical link $LL_i$ of the plurality of logical links $LL_i$ based on a required minimum bit rate $b_i$ of the corresponding logical link $LL_i$ and decrementing the image queue length $Q_i$ of said logical link $LL_i$ of the at least one timeslot TQ allocated to the corresponding logical link $LL_i$; and transmitting the data packets or REPORT messages in the communication network according to the image queue length $Q_i$ of the at least one timeslot TQ allocated to the logical links $LL_i$.

2. The method according to claim 1, wherein a multiple of $N_i$ consecutive timeslots TQs are allocated to each logical link $LL_i$ for which image queue is not zero, $N_i$ being a predefined integer greater than one defined for each logical link $LL_i$.

3. The method according to claim 1, wherein, M being a prefixed maximum number of logical links $LL_i$ to be served during a cycle k, only M logical links $LL_i$ having the lowest theoretical transmission times $TTT_i$ are allocated with at least one timeslot TQ of a next cycle k+1 for transmission of data packets.

4. The method according to claim 3, wherein timeslots TQs of the next cycle k+1 that have not been allocated are allocated to next logical links $LL_i$ with the lowest theoretical transmission times $TTT_i$ until all the timeslots TQs of the next cycle k+1 are allocated or until all image queue lengths $Q_j$ are zero in response to a determination that the M image queue lengths $Q_j$ of the M logical links $LL_i$ are zero after allocating at least one timeslot TQ of the next cycle k+1 for transmission of data packets.

5. The method according to claim 1, wherein, a polling period $PP_i$ being prefixed as an integer number of cycles for each logical link $LL_i$, timeslots TQs are allocated to a logical link $LL_i$ for transmission of a REPORT message at a next cycle in response to a determination that the image queue length of said logical link $LL_i$ remains zero during said polling period $PP_i$.

6. The method according to claim 1, wherein, a maximum bit rate $L_{max,i}$ being prefixed for each logical link $LL_i$, a peak bit rate period $T_{PBR}$ being prefixed, the number of timeslots TQs that are allocated to a given logical link $LL_i$, over the peak bit rate period $T_{PBR}$ is limited by the maximum bit rate $L_{max,i}$ of said logical link $LL_i$ multiplied by the peak bit rate period $T_{PBR}$.

7. The method according to claim 1, wherein the REPORT message further comprises multiple queue sets reporting different cumulative lengths of data frames contained in the queue of the logical link $LL_i$ sending the REPORT message and wherein a number $N_i$ of consecutive timeslots TQs allocated to said logical link $LL_i$ by the terminal equals one of said cumulative lengths.

8. The method according to claim 7, wherein a threshold is defined for each queue set and is preset as a multiple of the ratio of the number of timeslots TQs comprised in a cycle on the prefixed maximum number of logical links $LL_i$ to be served during one cycle and wherein the reported cumulative length is equal to the cumulative length of data frames of a queue set not exceeding said threshold of said queue set.

9. The method according to claim 1, wherein the plurality of logical links $LL_i$ is divided in subsets $S_j$ having a number $N_j$ of logical links $LL_i$, $N_j$ being greater than or equal to one, each subset $S_j$ being associated to a priority $p_j$, each priority $p_j$ being associated to a given minimum bit rate $B_j$, the minimum bit rate $b_i$ associated with a logical link $LL_i$ belonging to a subset $S_i$ is defined by a ratio of the given minimum bit rate $B_j$ to the number $N_j$.

10. The method according to claim 9, further comprising updating the minimum bit rate $b_i$ associated with a logical link $LL_i$ belonging to a subset $S_j$, each time a new logical link $LL_i$ enters or quits said subset $S_j$.

11. The method according to claim 9, wherein the logical links $LL_i$ of a same subset $S_j$ have different minimum bit rates $b_i$, the sum of the minimum bit rates $b_i$ of the logical links of the subset $S_j$ being lower than the given minimum bit rate $B_j$ associated with the priority $p_j$ of the subset $S_j$.

12. A non-transitory computer readable storage medium, with a program stored thereon, wherein the program is set up to perform the method according to claim 1 when executed by a processor.

13. A terminal configured to allocate timeslots for transmission of data packets and REPORT messages in a communication network, said network including a plurality of logical links $LL_i$ managed by a terminal, each logical link being associated to a queue containing waiting data packets to be sent, a minimum bit rate $b_i$ being required by each logical link for transmission of the data packets, time being divided in cycles, each cycle being divided in equal timeslots TQs, a length of a queue being expressed in timeslots TQs, a theoretical transmission time $TTT_i$ being initially defined in said terminal for each logical link $LL_i$, respectively, and the terminal storing an image queue length $Q_i$ for each logical link $LL_i$, respectively, the terminal comprising:
  a receiver that receives at least one REPORT message from a logical link $LL_i$ in the plurality of logical links $LL_i$, said REPORT message including an updated queue length of said corresponding logical link $LL_i$, said length being expressed in timeslots;
  a processor configured to update, upon reception of said REPORT message from said logical link $LL_i$, said image queue length $Q_i$ for said corresponding logical link $LL_i$ based on the updated queue length;
  the processor further configured to allocate, to each of the logical links in the plurality of logical links $LL_i$, for which image queue length is not zero, at least one timeslot TQ in a next cycle k+1 based on the theoretical transmission time $TTT_i$ of the corresponding logical link $LL_i$ for transmitting the data packets or REPORT messages and based on a length of a Guard Band Interval and a number of timeslots required to transmit the REPORT messages, timeslots TQs being allocated until all timeslots TQs of the next cycle k+1 are allocated or until all image queue lengths $Q_i$ are zero;
  the processor further configured to increment the theoretical transmission time $TTT_i$ of each logical link $LL_i$ of the plurality of logical links $LL_i$ based on a required minimum bit rate $b_i$ of the corresponding logical link $LL_i$ and decrementing the image queue length $Q_i$ of said logical link $LL_i$ of the at least one timeslot TQ allocated to the corresponding logical link $LL_i$; and
  a transmitter configured to transmit a GATE message instructing a network node to transmit the data packets or REPORT messages in the communication network according to the image queue length $Q_i$ of the at least one timeslot TQ allocated to a corresponding logical link $LL_i$.

14. A system comprising:
a plurality of network nodes, each node comprising at least one logical link $LL_i$, and a terminal for managing said logical links $LL_i$, each logical link being associated to a queue containing waiting data packets to be sent, a minimum bit rate $b_i$ being required by each logical link for transmission of the data packets, time being divided in cycles, each cycle being divided in equal timeslots TQs, a length of a queue being expressed in timeslots TQs, a theoretical transmission time $TTT_i$ being initially defined in said terminal for each logical link $LL_i$, the terminal storing an image queue length $Q_i$ for each logical link $LL_i$,
the terminal including
a receiver that receives at least one REPORT message from a logical link $LL_i$ in the plurality of logical links $LL_i$, said REPORT message including an updated queue length of said corresponding logical link $LL_i$, said length being expressed in timeslots;
a processor configured to update, upon reception of said REPORT message from said logical link $LL_i$, said image queue length $Q_i$ for said corresponding logical link $LL_i$ based on the updated queue length;
the processor further configured to allocate, to each of the logical links in the plurality of logical links $LL_i$, for which image queue length is not zero, at least one timeslot TQ in a next cycle k+1 based on the theoretical transmission time $TTT_i$ of the corresponding logical link $LL_i$ for transmitting data packets or REPORT messages and a length of a Guard Band Interval and a number of timeslots required to transmit the REPORT messages, timeslots TQs being allocated until all timeslots TQs of the next cycle k+1 are allocated or until all image queue lengths $Q_i$ are zero;
the processor further configured to increment the theoretical transmission time $TTT_i$ of each logical link $LL_i$ of the plurality of logical links $LL_i$ based on its required minimum bit rate $b_i$ of the corresponding logical link $LL_i$ and decrementing the image queue length $Q_i$ of said logical link $LL_i$ of the at least one timeslot TQ allocated to the corresponding logical link $LL_i$; and
a transmitter configured to transmit a GATE message instructing a network node to transmit the data packets or REPORT messages in a communication network according to the image queue length $Q_i$ of the at least one timeslot TQ allocated to a corresponding logical link $LL_i$.

* * * * *